Nov. 6, 1951  W. C. BLINN ET AL  2,573,685

HUMIDOSTAT

Filed April 15, 1947

INVENTORS
WELFORD C. BLINN
WILLIAM R. BAILEY.

BY

ATTORNEY

Patented Nov. 6, 1951

2,573,685

UNITED STATES PATENT OFFICE 2,573,685

HUMIDOSTAT

Welford C. Blinn, United States Navy, Arlington, Va., and William R. Bailey, Washington, D. C.

Application April 15, 1947, Serial No. 741,658

7 Claims. (Cl. 297—1)

(Granted under the act of March 3, 1883, as amended April 30, 1928; 370 O. G. 757)

This invention relates to humidity indicating devices and more particularly to a new and improved indicator pointer adapted for cooperation with a graduated dial to indicate the relative humidity of the atmosphere in which the indicator pointer is enveloped.

While the particular humidity indicator of the present invention is of general application, it was developed mainly for use in conjunction with Navy fire control instruments. It has been found that the working parts of such fire control instruments become corroded in the presence of moisture notwithstanding prior attempts to make the housing for such instruments airtight. Accordingly, it has been the practice periodically to circulate a drying medium through these instruments. In the reverse fleet, a desiccator is placed within the housing of each major fire control instrument to maintain dryness and thereby prevent the formation of rust and fungus growth. In the above circumstances, it is desirable to have within each instrument a reliable, inexpensive means for indicating relative humidity to determine the necessity for the drying operation or for the replacement or rejuvenation of the desiccator. For this use the common commercially available "hair type" of humidity indicator is unsuitable mainly because of its size and also because it is expensive, and does not possess an adequate range over which it is not permanently affected by temperature. Moreover, the prior "hairtype" humidostats appear to be detrimentally affected by vibration and rust.

Because of these shortcomings in "hair type" humidostats, we set out to obtain a smaller and less expensive instrument that would be substantially insensitive to temperature variations and vibrations. A review of the art disclosed the prior teachings of humidity-sensitive indicator pointers made of laminated materials having different hygroscopic characteristics; e. g., those humidity-sensitive elements made of different woods, i. e., yew wood and Alaska cedar; others of brass and cellulose nitrate or brass and cellulose acetate and gelatin or albumen-coated Celluloid or paper.

It appeared that the employment of the laminated humidity-sensitive element as a pointer would be admirably suitable for our particular purpose. Accordingingly, extensive investigations were undertaken in order to obtain a humidostat that would be accurate, reliable and otherwise suitable. In the course of our investigations, it was observed that the humidity indicators constructed of laminated wood are relatively insensitive and inconsistent by being subject to shrinkage thereby taking on permanent set or deformation producing gross inaccuracies in their indications. Similarly, our investigations revealed that other types of humidity indicators employing metal as the insensitive element and gelatin or common cellulose materials, such as cellulose acetate and cellulose nitrate, as the sensitive elements also have high shrinkage rates and are unmatched as to thermal characteristics. It was observed, as a result of our research, that available plastic materials presented a wide range in moisture sensitivities and we hit upon the idea of utilizing as a pointer for a humidostat a humidity-sensitive element formed of a bi-plastic; i. e., a lamination formed preferably of two strips of different plastic materials having different moisture absorption characteristics, the said strips being secured together in face to face relation by means of a suitable adhesive. It was believed possible through the employment of such a bi-plastic lamination to obtain a humidity sensitive element that would be relatively unaffected by temperature changes since it appeared that the thermal coefficients of expansion for the particular plastics employed could be more nearly matched.

Such cellulose materials as cellulose acetate and cellulose nitrate were known to be moisture sensitive and were selected originally as the moisture sensitive element. We noted, however, that these materials included a high percentage of plasticizer in their formulation a large portion of which is fugitive, i. e. has a high evaporation rate and is prone to "bleed out" as it diffuses toward the surface. We discovered that as this plasticizer leached out in ageing the plastic strip would shrink thereby producing a permanent deformation in the bi-plastic indicator. Nylon and many other plastics were tested and discarded as unsatisfactory because they also possess this same shrinkage characteristic which continually caused inaccuracies in the calibration of the instrument. It was found that this shrinkage increased materially as the temperature exceeded 110° F. Subsequent to this discovery of the factors producing deformations in the sensitive element, it occurred to us that ethyl cellulose should be investigated for its moisture sensitivity since it was known to possess a very small percentage of plasticizer. Ethyl cellulose was found to possess moisture sensitivity approximately equal to cellulose acetate, or cellulose nitrate for example, and severe shrinkage tests revealed this material to possess surprising dimensional stability. Moreover, we discovered as a result of our shrinkage tests that the dimensional stability of the ethyl cellulose stock containing even the small percentage of plasticizer could be improved by a curing or stabilizing process which involved cycling the stock within a temperature range of from 0° to 120°–180° F. daily for a period of from one to two weeks. It was found desirable also in this stabilizing process to vary the moisture content within a range of from 0–25% to 80–100% relative humidity.

For the non-hygroscopic plastic element a group of plastics referred to herein, and in the technical literature, as vinyl plastics was found to be non-compatible with ethyl cellulose and to have only slight (.05 to 1.0%) dimensional increase when subjected to relative humidity changes from 0 to 100%. Included within this group are the following: vinyl chloride polymer, vinyl chloride acetate copolymer, and styrene polymer. It was observed that the coefficients of thermal expansion for degree centigrade per centimeter for this particular group of vinyl plastics varied from around 6 to $19 \times 10^{-5}$ comparing favorably with the coefficient of the thermal expansion for ethyl cellulose which varies from 10 to $14 \times 10^{-5}$ indicating that a humidity sensitive element could be fabricated from these plastics that would be relatively thermally insensitive. We have observed that an ethyl cellulose plastic obtainable in thin sheets varies as to its temperature coefficient of thermal expansion according to slight changes in composition or in process of manufacture. Therefore, in order accurately to match its thermal characteristics with the particular non-humidity sensitive element we have found it necessary to utilize different materials depending upon the particular process or method of manufacture of the particular ethyl cellulose stock. Exceedingly satisfactory results have been obtained through the utilization of thin strips of stabilized ethyl cellulose and polystyrene secured together in face to face relation by means of a suitable adhesive. Other ethyl cellulose stock containing no plasticizer in its formulation is available commercially and more nearly matched thermal characteristics may be obtained if a vinylidene plastic, e. g., polymerized vinylidene chloride is utilized, as the relatively non-hygroscopic element, i. e., the element that is substantially dimensionally insensitive to humidity changes.

Accordingly, it is an object of our invention to provide an improved, compact and inexpensive relative humidity indicator or pointer which will accurately and consistently indicate the relative humidity.

It is a further and more specific object of our invention to provide in a humidity indicating device made up of laminated materials having different moisture sensitive characteristics, such materials that will be mutually non-compatible and dimensionally stable over a wide range of temperature and humidity, i. e., that will not be subject to cold flow but will return to their original dimensions after being cycled at varying temperatures and humidity.

It is still a further object of our invention to provide a humidity indicator of improved construction.

Further objects and advantages of our invention will become more apparent from the specification as the specific features of certain preferred modifications are herein described in detail in connection with the accompanying drawings.

Figure 1:
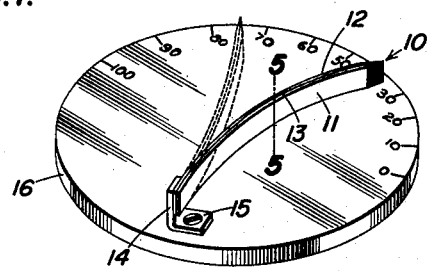
Fig. 1 is a perspective view of the simplest form of the improved humidostat.

Referring now to the drawings, there is shown in Fig. 1 a humidity indicator employing a single sensitive element 10. This element is a laminated plastic wherein the lamina 11 represents the moisture sensitive or relative hygroscopic element cut from a thin (.001 to .010″) sheet or strip of ethyl cellulose stock that has preferably been subjected to a curing or stabilizing process that involves cycling the stock at temperatures varying from 0° F. to 120–180° F. daily for a period of from one to two weeks, with the moisture content of the atmosphere varying also from 0–25% to 80–100% relative humidity. This cycling operation serves to neutralize strains and to remove fugitive plasticizer and solvent components. The lamina 12 is the non-moisture sensitive member or relative non-hygroscopic member, and is formed of a thin (.001 to .010″) sheet or strip of vinyl plastic, including vinyl acetate chloride copolymer and a polyvinyl chloride, or polystyrene, the polystyrene being preferred for use with stabilized ethyl cellulose stock containing prior to stabilization of from ¼ to 15% plasticizer. This ethyl cellulose stock and polystyrene have closely matched thermal coefficients of expansion and the polystyrene is stable at temperatures as high as 170° F. Vinylidene chloride is preferred for use with ethyl cellulose sheet stock that employs practically no plasticizer in its formulation because its coefficient of thermal expansion more nearly matches that of this particular ethyl cellulose. The strip of the ethyl cellulose material and the strip of non-hygroscopic plastic material are secured together in face to face relation preferably by means of a suitable adhesive.

A large number of pressure sensitive adhesives may be employed provided such adhesive remains permanently flexible and is non-chemically effecting with the plastic sheets. We have found that highly satisfactory results are obtained through the utilization of these available adhesives that remain elastic and retain a good bond throughout the wide range of humidity and temperature. After the laminated sheet plastic is assembled on a flat surface it is then preferably subjected also to cycling at varying temperature and humidity similar to that involved in stabilizing the ethyl cellulose. This temperature and humidity cycle serves to improve the dimensional stability of the assembly and remove strains that may exist or be set up in the assembly operation. Thereafter a strip of suitable width is cut from the laminated sheet and an end thereof is mounted, as at 14 by a suitable adhesive, for example, to one side of the support on post 15. The post 15 is shown secured to a non-hygroscopic base plate 16 formed, for example, of a polymerized methyl methacrylate resin e. g., "Lucite." This modification of our invention is adapted for insertion in the fire control instrument so that the pointer may be viewed through the window thereof and is accordingly provided with no additional cover. The base member 16 is shown provided with a graduated scale over a segment of its periphery for cooperation with the pointer 10, the free end of which may be colored if desired to give a vivid indication of the relative humidity.

Figure 2:
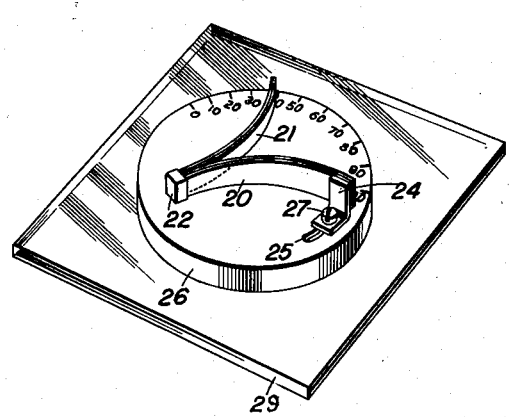
Fig. 2 is a perspective view of a modified form thereof wherein a high degree of sensitivity is obtained, by means of dual bi-plastic sensitive elements.

In the construction shown in Fig. 2 two sensitive elements 20 and 21 are employed, each of which comprise the particular novel bi-plastic lamination described above assembled so as to have at normal relative humidity a pre-determined curvature. This may be achieved for example, by assemblying the laminae at normal humidity (40%–50%) about a curved rather than a flat surface; or a flat surface may be used if the strips or sheets are assembled at controlled high (near 100%) or low (near 0%) relative humidity. When assembled at normal humidity about a curved surface each of the sensitive elements is preferably equally arcuated but it is not essential to the invention. These two sensitive elements are secured together at their ends by an adhesive and if desired by a bonding tape illustrated at 22 so that the respective convex sides are in facing relation. One end, 23, of this assembly is secured to a post or support 24 mounted for adjustment in an arcuate slot 25 of the non-hygroscopic base plate 26 by means of the screw 27, for example. The other end of the dual pointer is free to move and will by virtue of this construction substantially coincide with the radii drawn from a fixed center. The advantage of this construction resides in the fact that because the end of the pointer moves substantially as a radius the scale and pointer may be relatively adjusted. As in Fig. 1 the free end of the pointer may be colored to vividly indicate the relative humidity through cooperation with the graduations formed on the arcuate portion of the base plate 26.

Figure 4:
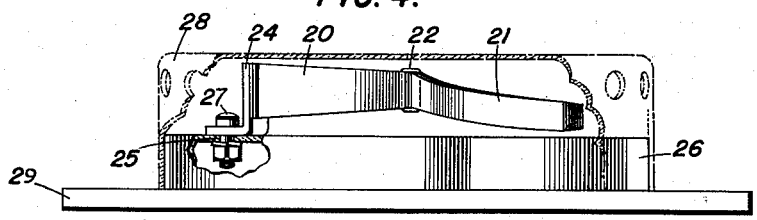
Fig. 4 is a side elevation of the humidostat illustrated in Fig. 2.
Figure 5:
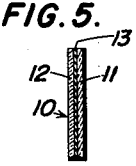
Fig. 5 is a cross section taken on line 5—5 of Fig. 1.

In the assembly of the bi-plastic elements illustrated in Figs. 2 and 4 we preferred to have the humidity sensitive plastic, i. e., ethyl cellulose, form the convex outer surface to which the non-humidity sensitive plastic, e. g., polystyrene is secured by an adhesive. In this manner the bond joining the two arcuated humidity sensitive elements is formed between the two humidity insensitive plastics, e. g., polystyrene. It should be clear, however, that the order of assembly of the sheet plastic may be reversed so that the non-humidity sensitive plastic, e. g., polystyrene, forms the convex surface to which the humidity sensitive plastics, i. e., ethyl cellulose, is attached. With such a construction a reverse scale would be employed and the bond joining the two humidity sensitive elements would be between the outer surfaces of the ethyl cellulose plastic strips.

As illustrated in Fig. 4 the base plate 26 may be mounted on an additional plate 29 adapted to receive and support a suitable ventilated housing 28 formed also of a transparent non-hygroscopic material, e. g., "Lucite." Since the humidostat pointer 20—21 is cantilever mounted it is preferred to taper the pointer as to width in the manner indicated in Fig. 4. By so tapering the pointer from its support, the bond between the pointer and the support 24 will be relieved of any unnecessary strain. It is to be understood also that the housing 28 will not be used if the humidostat is positioned within a fire control instrument or other suitable enclosure for indicating the relative humidity therein; and that the illustration of the housing in Fig. 4 is for the purpose of showing domestic utility of our invention.

Figure 3:
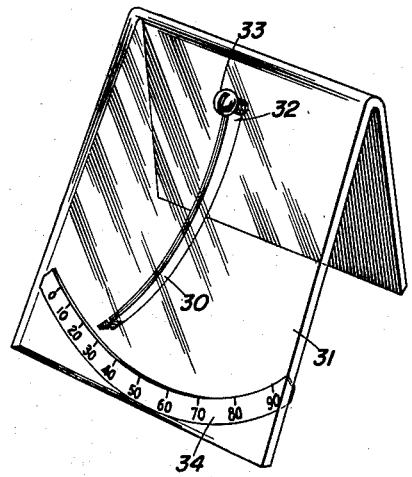
Fig. 3 is a perspective view illustrating indicator of the type shown in Fig. 1 by employing a modified support.

Fig. 3 illustrates the manner in which our invention may be otherwise readily adapted to domestic use. Here a pointer 30 similar in construction to that illustrated in Fig. 1 is attached at an end 32 to the projecting surface of a screw 33 at the underside of the front face of a V-shaped transparent non-hygroscopic support 31. The pointer 30 is then free to move across the under face of the support for cooperation with the graduated dial, secured also to the front portion of the V support 31.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

The invention herein described may be manufactured and used by or for the Government of the United States of America for governmental purposes without the payment of any royalties thereon or therefor.

We claim:

1. In the combination of a humidity indicating device the improvement comprising a flexible laminated pointer adapted for cooperation with a dial, said pointer including a first dimensionally stabilized strip of ethyl cellulose containing substantially no fugitive plasticizers and having a thickness within the range of from .001 to .010 inch, a second strip of substantially nonhygroscopic synthetic resin dimentionally similar to said first strip and juxtaposed thereto, said second strip being selected from the group consisting of vinyl acetate chloride copolymer, polyvinyl chloride, polymerized vinylidene chloride and polystyrene, and a uniform layer of a normally tacky pressure sensitive adhesive coextensive with said strips and interleaved there between whereby to secure said strips together in face to face relation throughout their juxtaposed surfaces.

2. The combination defined in claim 1 wherein said nonhygroscopic synthetic resin is polystyrene.

3. A flexible laminated hygroscopic element, fixed at one end and adapted to move at its opposite end in response to changes in humidity, consisting of a first dimensionally stabilized narrow strip of ethyl cellulose containing substantially no fugitive plasticizers, and a second strip of substantially nonhygroscopic plastic dimensionally similar to said first strip and secured thereto in face to face relation, said second strip being made of a material selected from the group consisting of polyvinyl chloride, polymerized vinylidene chloride, polystyrene, and copolymer of vinyl acetate and chloride.

4. The combination defined in claim 3 wherein said nonhygroscopic plastic is polystyrene.

5. A flexible laminated hygroscopic element, fixed at one end and adapted to move at its opposite end in response to changes in humidity, consisting of a first dimensionally stabilized narrow strip of ethyl cellulose having a thickness within the range of from .001 to .010 inch and containing substantially no fugitive plasticizers, and a second strip of substantially nonhygroscopic plastic selected from the group consisting of polyvinyl chloride, polymerized vinylidene chloride, polystyrene, and copolymer of vinyl acetate and chloride, said second strip being dimensionally similar to said first strip and secured thereto by means of a normally tacky pressure sensitive adhesive.

6. The combination defined in claim 5 wherein said nonhygroscopic plastic is polystyrene.

7. The combination defined in claim 3 wherein said first strip is fabricated from sheet stock containing less than ¼ of 1% plasticizer in its formulation and said nonhygroscopic plastic is polymerized vinylidene chloride.

WELFORD C. BLINN.
WILLIAM R. BAILEY.

REFERENCES CITED

The following references are of record in the file of this patent:

UNITED STATES PATENTS

| Number | Name | Date |
| --- | --- | --- |
| 1,293,527 | Ovington | Feb. 4, 1919 |
| 1,627,935 | Stinchfield | May 10, 1927 |
| 1,846,230 | Stuber | Feb. 23, 1932 |
| 1,920,502 | Goss | Aug. 1, 1933 |
| 2,093,767 | Rollefson | Sept. 21, 1937 |
| 2,286,710 | Bohnstedt | June 16, 1942 |